US012393543B2

(12) United States Patent
Tran et al.

(10) Patent No.: US 12,393,543 B2
(45) Date of Patent: Aug. 19, 2025

(54) SYSTEM AND METHOD FOR UTILIZING A DATA STORAGE DEVICE WITH POWER PERFORMANCE PROFILES AND/OR TEMPERATURE MONITORING

(71) Applicant: Western Digital Technologies, Inc., San Jose, CA (US)

(72) Inventors: Phong Thieu Tran, Aliso Viejo, CA (US); Anthony Hubert Welsh, Laguna Hills, CA (US); San A Phong, Cerritos, CA (US); Charles Andrew Neumann, Lake Forest, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 106 days.

(21) Appl. No.: 18/216,348

(22) Filed: Jun. 29, 2023

(65) Prior Publication Data
US 2024/0054094 A1    Feb. 15, 2024

Related U.S. Application Data

(60) Provisional application No. 63/397,073, filed on Aug. 11, 2022, provisional application No. 63/397,078, filed on Aug. 11, 2022.

(51) Int. Cl.
*G06F 13/42* (2006.01)
(52) U.S. Cl.
CPC ...... *G06F 13/4234* (2013.01); *G06F 13/4282* (2013.01); *G06F 2213/0016* (2013.01); *G06F 2213/0042* (2013.01)
(58) Field of Classification Search
CPC ............. G06F 13/4234; G06F 13/4282; G06F 13/0026; G06F 13/0042
See application file for complete search history.

(56) References Cited

U.S. PATENT DOCUMENTS 9,811,267 B1   11/2017   Yang et al.
10,679,711 B2   6/2020   Matsumoto
(Continued)

FOREIGN PATENT DOCUMENTS

WO    2018049648 A1    3/2018

OTHER PUBLICATIONS

"What's Inside a Cine SSD DJI? Hack and Mods", VisionRouge. Net; Last accessed Jun. 29, 2023; https://www.visionrouge.net/whats-inside-a-cine-ssd-dji-can-you-use-a-simple-ssd-instead/; 8 pages.

*Primary Examiner* — Raymond N Phan
(74) *Attorney, Agent, or Firm* — LOZA & LOZA, LLP; Gabriel Fitch

(57) ABSTRACT

A data storage system for managing an operation of a solid-state device (SSD) includes the SSD, an adaptor coupled to the SSD via a first bus protocol and including a non-volatile memory storing a power configuration table. The protocol converter is configured to: couple to the adaptor using the first bus protocol, convert first signals of the first bus protocol to second signals for a second bus protocol, and couple to a host using the second bus protocol. The power configuration table includes power profiles for the SSD each corresponding to an interface type for the second bus protocol. The protocol converter is further configured to: determine an interface type of the second bus protocol, read the power configuration table from the non-volatile memory to determine a power profile corresponding to the determined interface type, and cause the SSD to operate using the determined power profile.

21 Claims, 10 Drawing Sheets

(56) References Cited

U.S. PATENT DOCUMENTS

| | | | |
|---|---|---|---|
| 11,061,619 B1* | 7/2021 | Benisty | G06F 3/0625 |
| 2011/0039443 A1 | 2/2011 | Fields et al. | |
| 2013/0117475 A1* | 5/2013 | Wei | G06F 13/1694 |
| | | | 710/33 |
| 2016/0070502 A1 | 3/2016 | Matsumoto | |
| 2016/0328347 A1* | 11/2016 | Worley | G06F 13/4022 |
| 2017/0115723 A1* | 4/2017 | Shurin | G06F 1/3287 |
| 2018/0189221 A1* | 7/2018 | Morning-Smith | |
| | | | G06F 13/4282 |
| 2019/0265897 A1* | 8/2019 | Nagai | G11C 16/30 |
| 2021/0294408 A1* | 9/2021 | Hodes | G06F 1/3253 |
| 2024/0004440 A1* | 1/2024 | Cudak | G06F 1/206 |
| 2024/0118736 A1* | 4/2024 | Hassan | G06F 1/3275 |

* cited by examiner

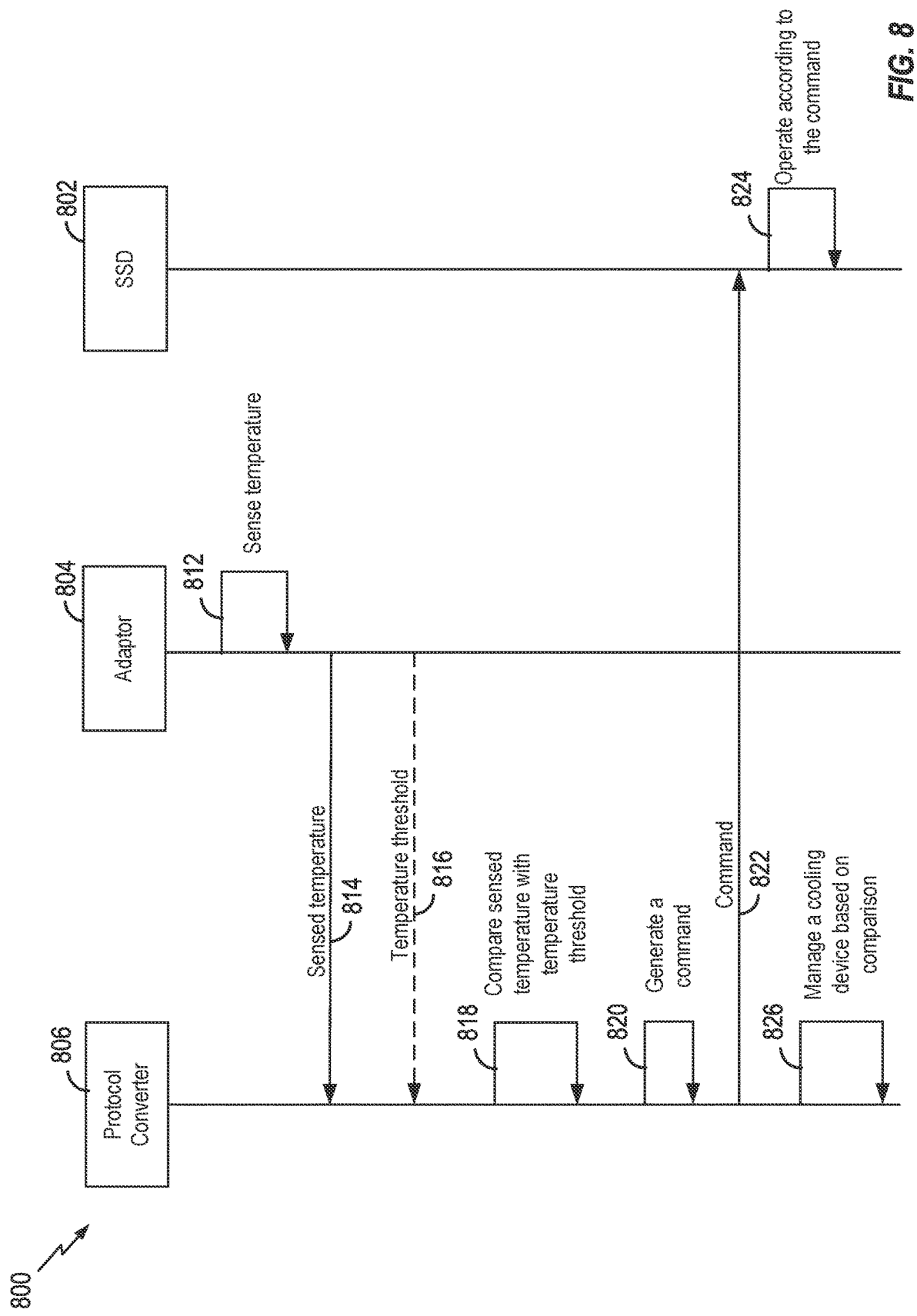

SYSTEM AND METHOD FOR UTILIZING A DATA STORAGE DEVICE WITH POWER PERFORMANCE PROFILES AND/OR TEMPERATURE MONITORING

CROSS REFERENCE TO RELATED APPLICATIONS

This application claims priority to and the benefit of Provisional Patent Application No. 63/397,078 filed in the United States Patent & Trademark Office on Aug. 11, 2022 and Provisional Patent Application No. 63/397,073 filed in the United States Patent & Trademark Office on Aug. 11, 2022, the entire content of each of which is incorporated herein by reference as if fully set forth below in its entirety and for all applicable purposes.

FIELD

The subject matter described herein relates to a system and a method involving a data storage device. More particularly, the subject matter relates, in some examples, to utilizing a power configuration table with power performance profiles and/or temperature monitoring by a temperature sensor residing at a data storage device.

Introduction

The operation of repurposed data storage devices, such as repurposed solid-state devices (SSDs), may present new challenges to SSD designs. For example, M.2 SSDs are peripheral component interconnect express (PCIe) native devices and originally designed to plug into a laptop or desktop personal computer's (PC's) M.2 internal slots. In that scenario, it is a captive device and not an external portable device. To leverage the small M.2 form factor and high performance as an external portable device, an external SSD reader can be used to mount the M.2 SSD and convert the M.2 native PCIe interface to a common interface such as universal serial bus (USB) or Thunderbolt (TB). However, USB and TB may support different power modes and M.2 SSDs can have different sizes and capabilities. It is also useful for the SSD reader to know the operating temperature of the SSD to assist with cooling or throttling.

Thus, operations of these repurposed SSDs can depend on power profiles and/or temperature of the SSDs. The power profile used to operate an SSD may depend on an interface type of an interface protocol used by the host to communicate with the SSD. For example, different power profiles may be selected depending on whether the interface type is a universal serial bus (USB) interface or a Thunderbolt interface for external SSDs. Further, for example, different power profiles may be used depending on types of data storage devices. A temperature at the data storage device should be monitored to ensure that the temperature is suitable for optimal uses of the data storage device. Accordingly, there is a need to configure repurposed SSDs with suitable power configurations and to monitor their temperature.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, this disclosure relates to a data storage system that includes a solid-state device (SSD) configured to store data, an adaptor coupled to the SSD via a first bus interface protocol and comprising a non-volatile memory storing a power configuration table, and a protocol converter. The protocol converter may be configured to: couple to the adaptor using the first bus interface protocol, convert first signals of the first bus interface protocol to second signals for a second bus interface protocol different from the first bus interface protocol, and couple to a host using the second bus interface protocol. The power configuration table may include a plurality of power profiles for the SSD each corresponding to one of a plurality of interface types for the second bus interface protocol. The protocol converter may be further configured to: determine an interface type of the second bus interface protocol, read the power configuration table from the non-volatile memory to determine a power profile of the plurality of power profiles that corresponds to the determined interface type, and send a command to the SSD to operate using the determined power profile.

In one aspect, this disclosure relates to a data storage system that includes a solid-state device (SSD) configured to store data, an adaptor coupled to the SSD via a first bus interface protocol and comprising a temperature sensor configured to sense a temperature of the SSD, and a protocol converter. The protocol converter may be configured to: couple to the adaptor using the first bus interface protocol, convert first signals of the first bus interface protocol to second signals for a second bus interface protocol different from the first bus interface protocol, and couple to a host using the second bus interface protocol. The protocol converter may be further configured to: receive the sensed temperature from the temperature sensor via the adaptor, determine whether the sensed temperature exceeds a temperature threshold, perform, responsive to the sensed temperature exceeding the temperature threshold, at least one of: sending a command to the SSD to throttle down operations at the SSD, or activating a cooling device configured to cool the SSD.

In one aspect, this disclosure relates to a method of managing an operation of a solid-state device (SSD) by a protocol converter, where the protocol converter is configured to couple to an adaptor coupled to the SSD using a first bus interface protocol, convert first signals of the first bus interface protocol to second signals for a second bus interface protocol different from the first bus interface protocol, and couple to a host using the second bus interface protocol. The method may include determining an interface type of the second bus interface protocol; reading a power configuration table from a non-volatile memory included in the adaptor, wherein the power configuration table comprises a plurality of power profiles for the SSD each corresponding to one of a plurality of interface types for the second bus interface protocol; determining a power profile of the plurality of power profiles that corresponds to the determined interface type; and sending a command to the SSD to operate using the determined power profile.

BRIEF DESCRIPTION OF THE DRAWINGS

FIG. 8 is an example flow diagram illustrating operations to read the SSD temperature and perform thermal management by a data storage system including an SSD, an adaptor, and a protocol converter, in accordance with some aspects of the disclosure.

DETAILED DESCRIPTION

Figure 1:
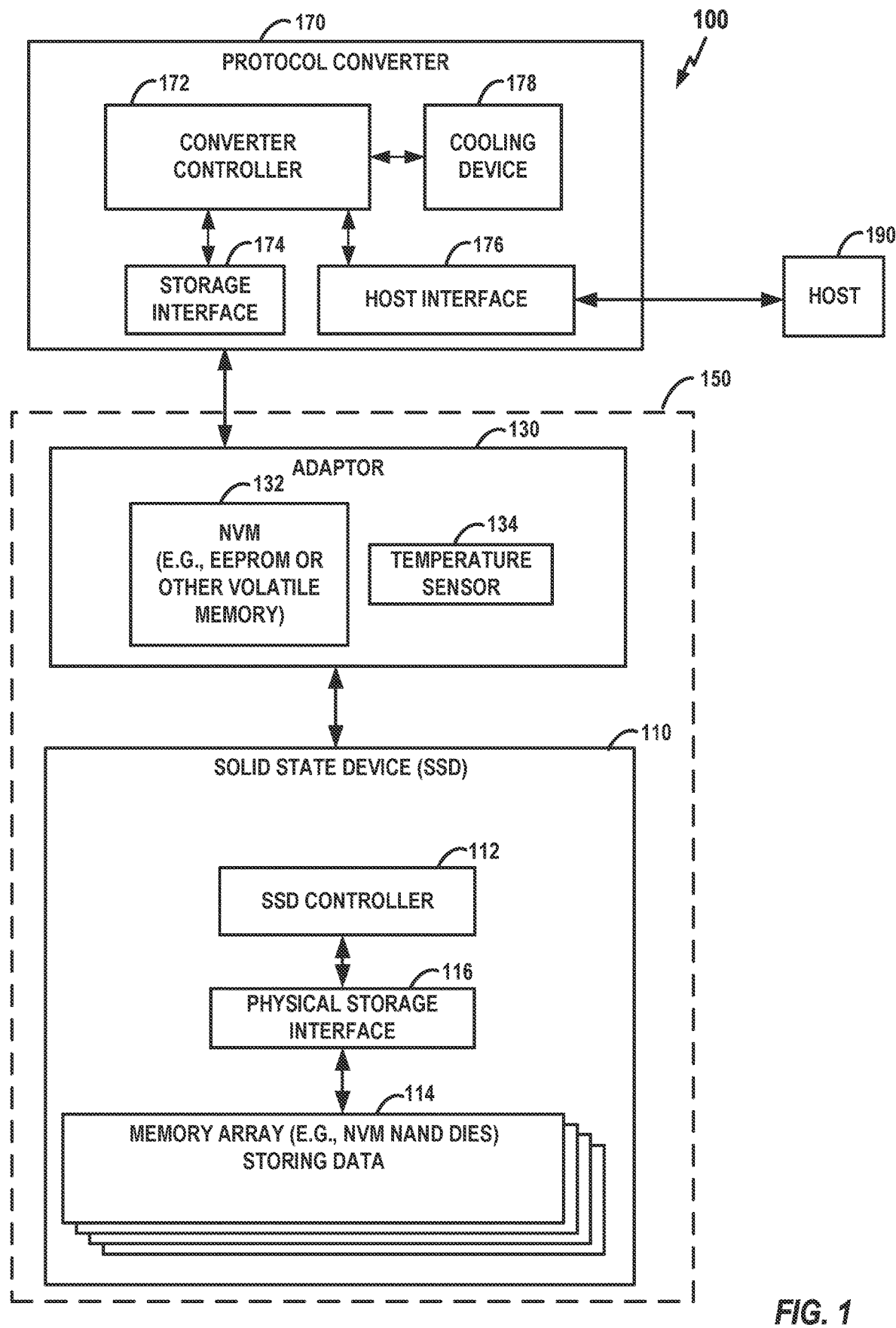
FIG. 1 is a schematic block diagram illustrating an exemplary data storage system including a data storage device (DSD) embodied as a solid-state device (SSD), a protocol converter to convert between a protocol for the SSD and a protocol for a host device, and an adaptor connecting the SSD and the protocol converter, where the data storage system communicates with a host device, in accordance with some aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to data storage devices (DSDs) and to data storage controllers of the DSDs. In the main examples described herein, data is stored within non-volatile memory (NVM) arrays. In other examples, data may be stored in hard disk drives (HDD). DSDs with NVM arrays may be referred to as solid state devices (SSDs). Some SSDs use NAND flash memory, herein referred to as "NANDs." A NAND is a type of non-volatile storage technology that does not require power to retain data. It exploits negative-AND, i.e., NAND, logic. For the sake of brevity, an SSD having one or more NAND dies will be used as a non-limiting example of a DSD below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

An SSD may be designed to directly couple to a computing device via a peripheral component interconnect (PCI) connection or a peripheral component interconnect express (PCIe) connection. For example, an SSD configured with an M.2 form factor may be configured to directly couple to an M.2 slot of a computing device (e.g., a desktop computer or a laptop computer). Hence, such an SSD may be a PCI/PCIe native device and may not be an external device that can be freely plugged in or pulled out from the computing device. The M.2 connector is a standard 68-pin M.2 key edge card connector designed to mount in the M.2 slot. Since it is an internal device, there is no enclosure for preventing mishandling and for ESD protection and easy transport. In addition, the M.2 card is not designed for multiple insertion and removal cycles as would a connection interface of an external storage device. There is a strong user desire to convert an M.2 SSD to an external portable device. Some of the benefits are small form factor, low power consumption, high performance, robust native PCIe interface, and hot-plug support. To read the portable M.2 SSD, an SSD reader (dock) is needed to mount the M.2 SSD and convert the native PCIe interface to a common interface such as USB or Thunderbolt (TB) supported by the host PC. The external reader would need to have a robust connector that the M.2 SSD is plugged into. In such case, mapping of the PCIe signals from M.2 connector to the new robust connector would be needed. Therefore, there is a need to develop a customized connector interface and mapping of the PCIe signals to a smaller robust connector while preserving the functionality and the signal and power integrity for high-speed operation.

To utilize this type of SSD (e.g., M.2 SSD) as an external device that can be portable separately from the computing device, an external protocol converter, which may also be referred to as an SSD reader, is needed to couple with the SSD and to convert signals of a PCIe interface protocol of the SSD to signals of a protocol of a host interface to the computing device, such as a USB interface or a TB interface. For example, interface types for the host interface may include USB3, USB4, TB3 and TB4, which are capable of handling different data transfer speeds (e.g., 5 gigabits per second (Gbps), 10 Gbps, 20 Gbps, 40 Gbps), respectively. The SSD reader may be designed to support a wide range of SSD storage capacity, such as 256 gigabyte (GB), 512 GB, 1 terabyte (TB), 2 TB, and 4 TB. An SSD with a higher storage capacity may require a higher amount of power from the SSD reader that may be bus-powered (e.g., via a USB connector) or device-powered (e.g., via an external power adaptor). Hence, depending on the SSD storage capacity and the interface type of the host interface, a different amount of power may be needed to operate the SSD.

A power configuration table may be implemented in the SSD reader, where the power configuration table indicates power profiles for a particular SSD, where each of the power profiles corresponds to a respective one of various interface types for the host interface. Because the power configuration table may be different for different SSDs (e.g., SSDs with different storage capacities), a new power configuration table may need to be implemented with the SSD reader when a new type of SDD is coupled to the SSD reader. In other words, every time a different SSD is coupled with the SSD reader, a new power table may be loaded to the SSD reader.

Hence, as more new types of SDDs are introduced, the SSD reader needs to be updated with new power configuration tables respectively corresponding to the new types of SSDs and thus a total size of the power configuration tables stored at the SSD reader may become larger over time. To receive a new power configuration table for a new type of SSD from a host device, the SSD reader may need to be plugged into the host device. Further, to accommodate new SSD types, the SSD reader's firmware may need to be updated constantly. In addition, the power configuration table is currently not provided for a Thunderbolt interface. Therefore, an efficient approach to provide and update power configuration tables for different types of SSDs and different interface types for the host interface is desired.

For a higher storage capacity and/or higher performance (e.g., high data transfer speed) SSD, the temperature at the SSD may become very high. For example, the temperature at the SSD may increase as the SSD is utilized at a high performance level. Hence, the SSD reader may be configured to manage the SSD temperature by controlling a cooling device (e.g., a fan) and/or managing the performance level of the SSD for thermal management. However, the SSD reader lacks temperature monitoring capability.

According to some aspects of the disclosure, a data storage system is provided, where the data storage system includes an SSD, an adaptor coupled to the SSD via a first bus interface protocol, and a protocol converter configured to couple to the adaptor using the first bus interface protocol. The protocol converter may be configured to convert first signals of the first bus interface protocol to second signals for a second bus interface protocol different from the first bus interface protocol, and may be configured to couple to a host using the second bus interface protocol. Hence, for example, the protocol converter may be used to convert between the first signals of the first bus interface protocol associated with the SSD and the second signals of the second bus interface protocol associated with the host.

In some aspects, the adaptor may include a non-volatile memory that stores a power configuration table, where the power configuration table includes multiple power profiles for the SSD. Here, each power profile corresponds to one of interface types for the second bus interface protocol and a corresponding power delivery capability.

In some aspects, the protocol converter may be configured to determine an interface type of the second bus interface protocol, read the power configuration table from the non-volatile memory to determine a particular power profile out of the multiple power profiles that corresponds to the determined interface type, and send a command to the SSD to operate using the determined power profile.

In some aspects, the adaptor may include a temperature sensor configured to sense a temperature of the SDD. The protocol converter may be configured to receive the sensed temperature from the temperature sensor via the adaptor, and determine whether the sensed temperature exceeds a temperature threshold. The adaptor is configured in such a way that, if the sensed temperature exceeds a temperature threshold, the adaptor sends a command to the SSD to throttle down operations at the SSD, and/or activates a cooling device configured to cool the SSD.

FIG. 1 is a schematic block diagram illustrating an exemplary data storage system including a data storage device (DSD) embodied as a solid-state device (SSD), a protocol converter to convert between a protocol for the SSD and a protocol for a host device, and an adaptor connecting the SSD and the protocol converter, where the data storage system communicates with a host device, in accordance with some aspects of the disclosure. The system 100 includes an SSD 110 (or other DSD, but for simplicity referred to as an SSD below), an adaptor 130 coupled to the SSD 110, and a protocol converter 170 coupled to the adaptor. In some aspects, the SSD 110 may be configured with an M.2 form factor, such that the SSD may be connected to the adaptor 130 via an M.2 connection.

The host 190 provides commands to the SSD 110 for transferring data between the host 190 and the SSD 110. For example, the host 190 may provide a write command to the SSD 110 for writing data to the SSD 110 and/or a read command to the SSD 110 for reading data from the SSD 110. The host 190 may be any system or device having a need for data storage or retrieval and a compatible interface for communicating with the SSD 110. For example, the host 190 may be a computing device, a personal computer, a portable computer, a workstation, a server, a personal digital assistant, a digital camera, a drone, or a digital phone, as merely a few examples.

The SSD 110 includes an SSD controller 112, a memory array 114 having one or more dies storing data, and a physical storage (PS) interface 116 (e.g., flash interface module (FIM)) to enable communication between the SSD controller 112 and the memory array 114. The SSD controller 112 is coupled to the SSD 110 as well as to the memory array 114 via the PS interface 116. The memory array 114 may include multiple dies. In some examples, the memory array 114 may be an NVM array.

The adaptor 130 is coupled to the SSD 110 via a first bus interface protocol. The adaptor 130 may couple with the protocol converter 170, such that the protocol converter 170 may communicate with the SSD 110 via the adaptor 130. In some aspects, the SSD 110 and the adaptor 130 may be coupled together to form a memory unit 150, which may be coupled to the protocol converter 170 using the adaptor 130.

The protocol converter 170 may include a converter controller (e.g., bridge controller) 172 to control various operations and components of the protocol converter 170. The protocol converter 170 may further include a storage interface 174 and a host interface 176, which may be connected to the converter controller 172. The protocol converter 170 may be configured to couple to the adaptor using the first bus interface protocol. For example, the storage interface 174 may facilitate communication between the adaptor 130 and the converter controller 172 using the first bus interface protocol. The converter controller 172 may communicate signals with the storage interface 174, which may be communicated with the adaptor 130 using the storage interface 174 via the first bus interface protocol. In some aspects, the first bus interface protocol may be specified by PCe.

The protocol converter 170 may be further configured to couple to the host 190 via the host interface 176 using a second bus interface protocol different from the first bus interface protocol. For example, the host interface 176 may facilitate communication between the host 190 and the converter controller 172 using the second bus interface protocol. The converter controller 172 may communicate signals with the host interface 176, which may be communicated with the adaptor 130 using the host interface 176 via the second bus interface protocol. In some aspects, the second bus interface protocol may be specified by USB, Thunderbolt, or another suitable high speed interface for external devices.

Because the first bus interface protocol and the second bus interface protocol are different, the protocol converter 170 performs conversion between signals of the first bus interface protocol and signals of the second bus interface protocols, e.g., using the converter controller 172, to enable communication between the SSD 110/adaptor 130 and the host 190. For example, the protocol converter 170 may be configured to convert first signals of the first bus interface protocol to second signals for a second bus interface protocol different from the first bus interface protocol and/or to convert the second signals of the second bus interface protocol to the first signals of the first bus interface protocol.

The host interface 176 may be any suitable communication interface, such as a Universal Serial Bus (USB) interface, a Thunderbolt interface, a Serial Peripheral Interface (SPI), or the like.

Although, in the example illustrated in FIG. 1, the SSD 110 includes a single channel between the SSD controller 112 and the memory array 114 via the PS interface 116, the subject matter described herein is not limited to having a single memory channel. For example, in some NAND memory system architectures, two, four, eight or more NAND channels couple the controller and the NAND memory devices, depending on controller capabilities. In any of the embodiments described herein, more than a single channel may be used between the controller and the memory die, even if a single channel is shown in the drawings. The controller 112 may be implemented in a single integrated circuit chip and may communicate with different layers of memory in the memory array 114 (e.g., NVM array) over one or more command channels.

The SSD controller 112 controls operation of the SSD 110. In some aspects, the protocol converter 170 may send a command to the SSD controller 112 via the adaptor 130, which controls the operation of the SSD 110 based on the command. In various aspects, the protocol converter 170 may receive commands from the host 190 through the host interface 176 and may send the commands to the SSD 110 via the adaptor 130, where the commands may be associated with transferring data between the host 190 and the memory array 114.

The SSD controller 112 may include any type of processing device, such as a System On chip (SOC), an application specific integrated circuit (ASIC), a microprocessor, a microcontroller, an embedded controller, a logic circuit, software, firmware, or the like, for controlling operation of the SSD 110. In some aspects, some or all of the functions described herein as being performed by the SSD controller 112 may instead be performed by another element of the SSD 110. For example, the SSD 110 may include a microprocessor, a microcontroller, an embedded controller, a logic circuit, software, firmware, ASIC, or any kind of processing device, for performing one or more of the functions described herein as being performed by the SSD controller 112. According to other aspects, one or more of the functions described herein as being performed by the SSD controller 112 are instead performed by the protocol converter 170 or the host 190. In still further aspects, some or all of the functions described herein as being performed by the SSD controller 112 may instead be performed by another element such as a controller in a hybrid drive including both non-volatile memory elements and magnetic storage elements.

The PS interface 116 provides an interface to the memory array 114. For example, in the case where the memory array 114 is implemented using a NAND flash memory, the PS interface 116 may be a flash interface module. In one aspect, the PS interface 116 may be implemented as a component of the SSD controller 112.

Although FIG. 1 shows an exemplary SSD and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, an embedded NVM array and associated circuitry. The processor could, as one example, off-load certain operations to the NVM and associated circuitry and/or components.

In one aspect, the SSD may further include an always on (AON) memory (not shown in FIG. 1). The AON memory which may be any suitable memory, computing device, or system capable of storing data with a connection to power that does not get switched off. For example, AON memory may be ordinary RAM. DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like with a continuous power supply. In one aspect, the AON memory may be a RAM with a continuous power supply (e.g., a connection to power that cannot be switched off unless there is a total loss of power to the SSD, such as during a graceful or ungraceful shutdown). In one aspect, the AON memory is a sub-component of the SSD controller. In one aspect, the AON memory is integrated in a sub-component (e.g., a processor such as an AON processor) of the SSD controller.

The current power configuration table often requires the SSD device to be plugged into a USB port, either directly or via a protocol converter. The current procedure to use the power configuration table determines what type of USB port is connected to the SSD device and then utilizes a power profile that corresponds to the USB port type. However, the current procedure does not consider using a Thunderbolt as an interface type for determining which power profile to use based on a power configuration table. Further, different types of SSDs need different power limitation values to meet different host configurations, and thus need different power profiles, which may be provided by the power configuration tables for different types of SSDs. The power configuration table may be stored in the protocol converter. However, in this case, for every new type of SSD device created, a new power configuration table needs to be provided to the protocol converter. Further, as numerous types of SSDs are created over time, many power configuration tables corresponding to the numerous types of SSDs are stored in the protocol converter, which may be burdensome for the protocol converter.

Therefore, in some aspects of the disclosure, the adaptor 130 may include a non-volatile memory 132, where the non-volatile memory 132 stores a power configuration table. The power configuration table stored in the non-volatile memory 132 may include multiple power profiles for the SSD 110, where each of the multiple power profiles corresponds to one of multiple interface types for the second bus interface protocol of a host interface. For example, one power profile may correspond to a USB interface type and another power profile may correspond to a Thunderbolt interface type. Hence, a different interface type for the host interface may correspond to a different power profile for the SSD 110. Further, the power configuration table stored in the non-volatile memory 132 of the adaptor 130 coupled to the SSD 110 may be specific for the type of the SSD 110 (e.g., since the adaptor 130 and the SSD 110 may be coupled together as a data storage unit). For example, where the SSD 110 includes various features, the power configuration table stored in the non-volatile memory 132 for the SSD 110 may be associated with (e.g., include settings for) at least one of the various features of the SSD 110. Hence, a particular type of SSD may have its particular power configuration table stored in the non-volatile memory for the SSD. In some aspects, the non-volatile memory 132 may be an electrically erasable programmable read-only memory (EEPROM), where the power configuration table for the SSD 110 is programmed in to the EEPROM. In some aspects, the adaptor 130 may be implemented using a printed circuit board (PCB), and the non-volatile memory 132 may be disposed on the PCB.

The converter controller (e.g., bridge controller) 172 of the protocol converter 170 may determine an interface type of the second bus interface protocol of the host interface 176. For example, when the adaptor 130 of the SSD 110 is plugged into the protocol converter 170, the converter controller 172 may read the power configuration table from the non-volatile memory 132 and determine a power profile that corresponds to the determined interface type of the second bus interface protocol of the host interface 176, out of the multiple power profiles in the power configuration table. Subsequently, the protocol converter 170 may generate and send (e.g., via the adaptor 130) a command to the SSD 110 to operate using the determined power profile power. For example, the command may include a power limitation value for the SSD 110 based on the determined power profile. In one example, if the interface type of the second bus interface protocol is a USB interface, the converter controller 172 may determine a power profile corresponding to the USB interface when reading the power configuration table for the SSD 110 from the non-volatile memory 132, such that the protocol converter 170 may send a command to the SSD 110 to operate based on the power profile corresponding to the USB interface.

In some examples, a power limitation value may be programmed into a persistent slot inside the SSD 110. The power limitation value appropriate for Thunderbolt mode may be high, typically 100% of the power. At power-on, the SSD 110 may utilize the lowest power limitation value (e.g., 0%) to ensure that the power used for the SSD 110 does not exceed the power for an interface type that utilizes the least amount of power. However, for an interface type that utilizes high power (e.g., 100%), a low power may limit the performance of such an interface type. The power configuration table may include multiple interface types of the interface protocol of the host interface and power profiles respectively for the multiple interface types, where each power profile may include a peak power and/or an average power used by the protocol converter 170 to set an operating power of the SSD 110. In one aspect, the protocol converter 170 sends the command to the SSD 110, where the command includes information about both peak and average power limits.

In some examples, the non-volatile memory 132 may include an inter-integrated circuit (I2C) bus interface, where the protocol converter 170 is configured to read the power configuration table from the non-volatile memory 132 using the I2C bus interface and via the adaptor 130. In an aspect, the I2C bus may be different from a bus of the first bus interface protocol (e.g., PCIe), where the first bus interface protocol may be used to communicate with the SSD 110. As such, the protocol converter 170 may receive the power configuration table from the non-volatile memory 132 without interfering with the communication between the protocol converter 170 and the SSD 110.

For a thermal management of the SSD 110, the converter controller 172 may be configured to determine a temperature of the SSD 110 to perform the thermal management of the operation of the SSD 110 based on the determined temperature of the SSD 110. For example, the converter controller 172 may be configured to throttle down the operation of the SSD 110 and/or control a cooling device (e.g., a fan) to maintain the SSD 110 below a safe operating temperature. In some aspects, the protocol converter 170 may include a cooling device 178 that may be controlled by the converter controller 172. In some aspects, the cooling device 178 may be positioned within the protocol converter 170 such that, when the SSD 110 is coupled to the protocol converter 170 via the adaptor 130, the cooling device 178 may be near the SSD 110 to be able to cool the SSD 110. In one aspect, for example the protocol converter 170 may have one or more openings to receive the adaptor/SSD unit such that the cooling device 178 can be located near the SSD 110.

A protocol converter may read a temperature at an SSD by issuing a read command (e.g., NVMe command) to the SSD to read a temperature from an SSD controller. However, this read command may be supported by USB bridge chip (e.g., ASM2362 FW) but may not be supported by a TB PCIe packet switch device (e.g., ASM2824). In particular, if the protocol converter utilizes a TB protocol for the host interface with a transparent PCIe switch, the protocol converter may not be able to initiate the read command. In addition, reading temperature, continuously or periodically, over a connection (e.g., PCIe connection) between the protocol converter and the SSD may negatively impact overall performance of this connection because this connection is also used for communication between the protocol converter and the SSD. Further, reading temperature may have a long latency between sending the read command and receiving the read temperature, especially when the SSD controller is in sleep mode because the SSD controller needs to wake up to read the temperature. Therefore, reading the SSD temperature from another interface or bus other than the connection interface for communication between the protocol converter and the SSD is desired.

In some aspects of the disclosure, the adaptor 130 may include a temperature sensor 134 configured to sense a temperature of the SSD 110. For example, the temperature sensor 134 may be disposed near the SSD 110 so as to sense an ambient temperature near the SSD 110. The converter controller 172 may receive the sensed temperature from the temperature sensor 134 via the adaptor 130 and determine whether the sensed temperature exceeds a temperature threshold. If the sensed temperature exceeds a temperature threshold, the converter controller 172 may send a command to the SSD 110 (e.g., via the adaptor 130) to throttle down operations at the SSD 110 and/or may activate the cooling device 178 configured to cool the SSD 110. For example, throttling down the operation at the SSD 110 and/or activating the cooling device 178 may lower the temperature of the SSD 110. If the sensed temperature is less than or equal to the temperature threshold, and the throttle down command was already sent, the converter controller 172 may send a command to stop throttling down the operation of the SSD 110 and/or may deactivate activate the cooling device 178. In an example, the SSD controller 112 may receive the command and throttle down or stop throttling down the operations at the SSD 110 based on the command.

The temperature threshold may be based on a highest temperature in which the SSD 110 (and other components) may operate with degraded performance and/or based on a temperature (e.g., 125 degrees F.) that a human can handle the SSD or the data storage unit 150 without hurting or burning the user.

In some examples, the temperature sensor 134 may include an I2C bus, where the protocol converter 170 is configured to receive the sensed temperature from the temperature sensor 134 via the I2C bus. In an aspect, the I2C bus may be different from a bus of the first bus interface protocol, where the first bus interface protocol may be used to communicate with the SSD 110. As such, the protocol converter 170 may receive the sensed temperature from the temperature sensor 134 without interfering with the communication between the protocol 170 and the SSD 110.

In an example, the temperature sensor 134 may be implemented on (e.g., integrated with) the non-volatile memory 132. In this example, the temperature sensor 134 and the non-volatile memory 132 may share the same connection interface (e.g., same I2C bus).

Figure 2:
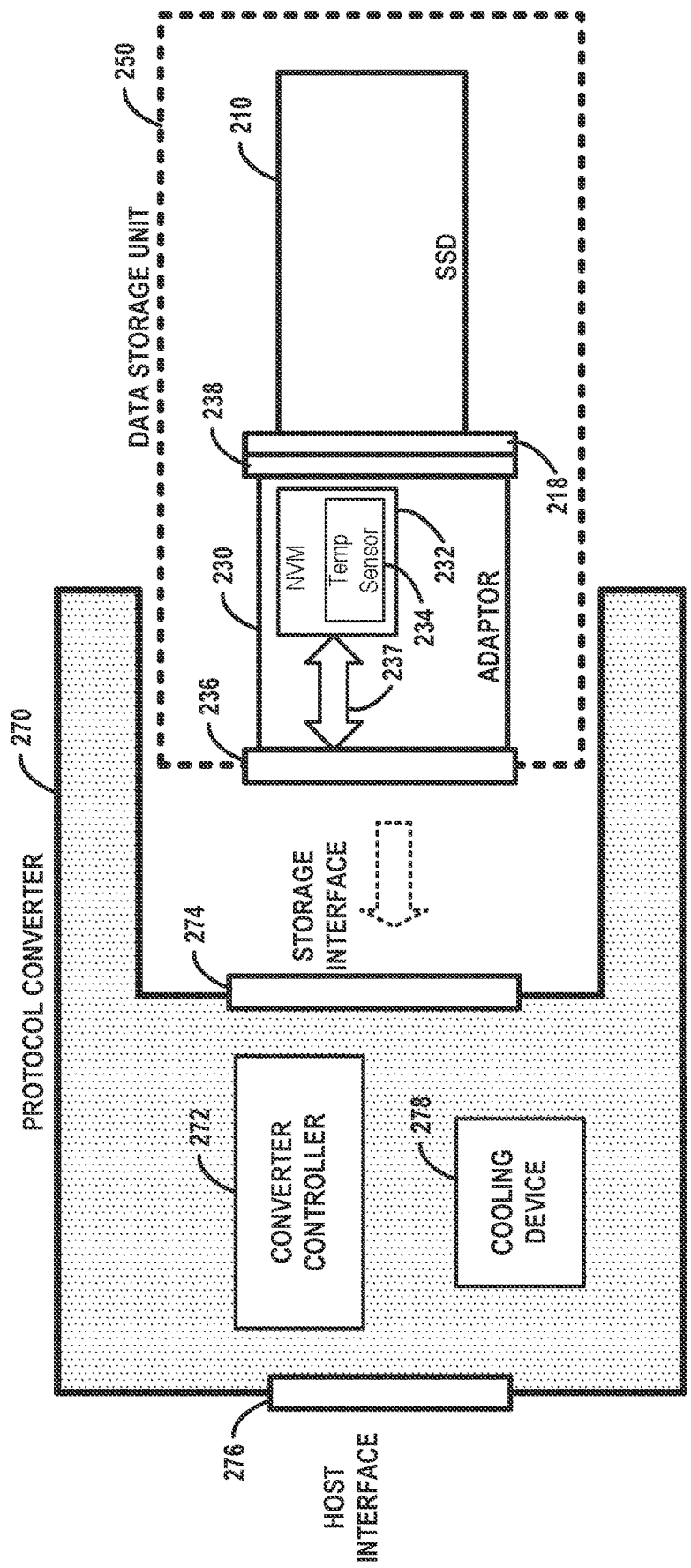
FIG. 2 is an example diagram of an SSD and an adaptor coupled to the SSD and a protocol converter that can be coupled to the adaptor, in accordance with some aspects of the disclosure.

FIG. 2 is an example diagram of an SSD 210 and an adaptor 230 coupled to the SSD 210 and a protocol converter 270 that can be coupled to the adaptor 230, in accordance with some aspects of the disclosure. The SSD 210 may include a connection interface 218 and may be coupled to the adaptor 230 via the connection interface 218 coupled to an SSD connection interface 238 of the adaptor 230. In some aspects, the adaptor 230 may include a non-volatile memory 232 that stores a power configuration table. In some aspects, the adaptor 230 may include a temperature sensor 234 to sense a temperature of the SSD 210. In some aspects, the temperature sensor 234 may be integrated with the non-volatile memory 232.

The adaptor 230 may include an adaptor interface 236 that is configured to couple with the protocol converter 270 via a storage interface 274, to provide a connection using a first bus interface protocol. In some aspects, the first bus interface protocol may be specified by PCIe. For example, the adaptor 230 may be plugged into the protocol converter 270 by coupling the adaptor interface 236 to the storage interface 274. When the adaptor interface 236 is coupled to the storage interface 274, then the protocol converter 270 may communicate with the adaptor 230 and with the SSD via the adaptor 230. In an example, a data storage unit (e.g., including the adaptor 230 and the SSD 210) may be inserted into the protocol converter 270 such that the adaptor interface 236 may be coupled to the storage interface 274, to provide a data connection between the protocol converter 270 and the adaptor 230.

The protocol converter 270 may further include a host interface 276 configured to couple with a host to provide a connection to the host using a second bus interface protocol. In some aspects, the second bus interface protocol may be specified by USB or Thunderbolt.

When the adaptor interface 236 is coupled to the storage interface 274, the converter controller 272 may communicate with the SSD 210 via the adaptor 230, to read data from the SSD 210 and/or to write data on the SSD 210. In addition, the converter controller 272 may read a power configuration table from the non-volatile memory 232 and/or the temperature sensed by the temperature sensor 234. The power configuration table may include power profiles for the SSD 210, where each of the power profiles corresponds to one of interface types for the second bus interface protocol. In an example, the interface types for the second bus interface protocol may be various types of USB interfaces and/or Thunderbolt interfaces. The converter controller 272 may select a power profile that corresponds to the interface type of the second bus interface protocol (e.g., interface type of the host interface 276) from the power profiles in the power configuration table. Subsequently, the converter controller 272 may send a command to the SSD 210 (e.g., via the adaptor 230), such that the SSD 210 may be operated using the selected power profile.

When the converter controller 272 reads the temperature sensed by the temperature sensor 234, the converter controller 272 may determine whether the sensed temperature exceeds a temperature threshold. If the sensed temperature exceeds the temperature threshold, the converter controller 272 may send a command to the SSD 210 to throttle down operations at the SSD 210, and/or activate the cooling device 278 to cool the SSD 210. If the sensed temperature does not exceed the temperature threshold, the converter controller 272 may send a command to the SSD 210 to stop throttling down the operation of the SSD 210, and/or may deactivate the cooling device 278.

In some aspects, the power configuration table and/or the sensed temperature may be communicated to the protocol converter 270 via a connection interface 237 separate from different from a connection interface of the first bus interface protocol used to communicate with the SSD 210. In an example, the connection interface 237 may include connections for an inter-integrated circuit (I2C) bus, where the IC bus is connected to the non-volatile memory 232 and/or the temperature sensor 234. Because the power configuration table and/or the sensed temperature may be read via a separate connection interface 237 (e.g., apart from the connection using the first bus interface protocol), the reading of the power configuration table and/or the sensed temperature may not interfere with communications with the SSD 210.

In some aspects, the SSD 210 may be implemented using an M.2 form factor with the connection interface 218 having a PCIe edge connector rated for a first number of insertion cycle. In this aspect, the SSD connection interface 238 of the adaptor 230 includes a first connector configured to receive the PCIe edge connector of the connection interface 218 and PCIe signals (e.g., from the SSD 210), where the first connector has a first number of pins. Further, in this aspect, the adaptor interface 236 includes a second connector rated for a second number of insertion cycles and configured to receive the PCIe signals, where the second connector has a second number of pins. In this aspect, the second number of insertion cycles is greater than the first number of insertion cycles, and the second number of pins is less than the first number of pins.

In an aspect, the first number of pins may be 68 and the second number of pins may be 40. In an aspect, 68 traces respectively corresponding to the pins of the first connector at the SSD connection interface 238 having 68 pins are integrated within a PCB having 4 layers or less. For example, a pin adaptor may be implemented to route the PCIe signals from the 68 pins of the first connector (e.g., M.2 connector) to the 40 pins of the second connector, while conforming to PCIe specification requirements on clock and data signals for impedance, trace length, cross talk, etc. This pin adaptor may be a printed circuit board assembly (PCBA), where the 68 traces respectively corresponding to the 68 pins of the first connector are integrated within the PCBA having 4 layers of PCBs or less. In an example, the dimension of the PCB layers may be 25 mm×16.8 mm×1.6 mm.

In an aspect, the protocol converter 270 and the adaptor 230 includes hot plug circuitry configured to indicate to the protocol converter 270 whether the adaptor 230 is connected to the protocol converter 270 via the second connector at the adaptor interface 236. In an aspect, where the storage interface 274 of the protocol converter 270 includes a third connector configured to couple with the second connector of the adaptor interface 236, the hot plug circuitry at the protocol converter 270 includes a pull up resistor coupled to a first pin of the third connector and a second pin of the third connector coupled to a ground, and the hot plug circuitry at the adaptor 230 is configured to complete a connection between the first pin and the second pin such that a voltage at the first pin is pulled to ground responsive to the adaptor being connected to the protocol converter via the second connector. An example with additional explanations on this aspect is provided below in reference to FIG. 6.

In some aspects, the SSD 210, the adaptor 230, and the protocol converter 270 may respectively correspond to the SSD 110, the adaptor 130, and the protocol converter 170 of FIG. 1, and thus the features of the SSD 210, the adaptor 230, and the protocol converter 270 may be similar to the features of the SSD 110, the adaptor 130, and the protocol converter 170, respectively. Further, in some aspects, the non-volatile memory 232, the temperature sensor 234, the reader controller 272, the storage interface 274, the host interface 276, and the cooling component 278 may respectively correspond to the non-volatile memory 132, the temperature sensor 134, the converter controller 172, the storage interface 174, the host interface 176, and the cooling component 178, and thus the features of the non-volatile memory 232, the temperature sensor 234, the converter controller 272, the storage interface 274, the host interface 276, and the cooling component 278 may be similar to the features of the non-volatile memory 132, the temperature sensor 134, the reader controller 172, the storage interface 174, the host interface 176, and the cooling component 178, respectively.

Figure 3:
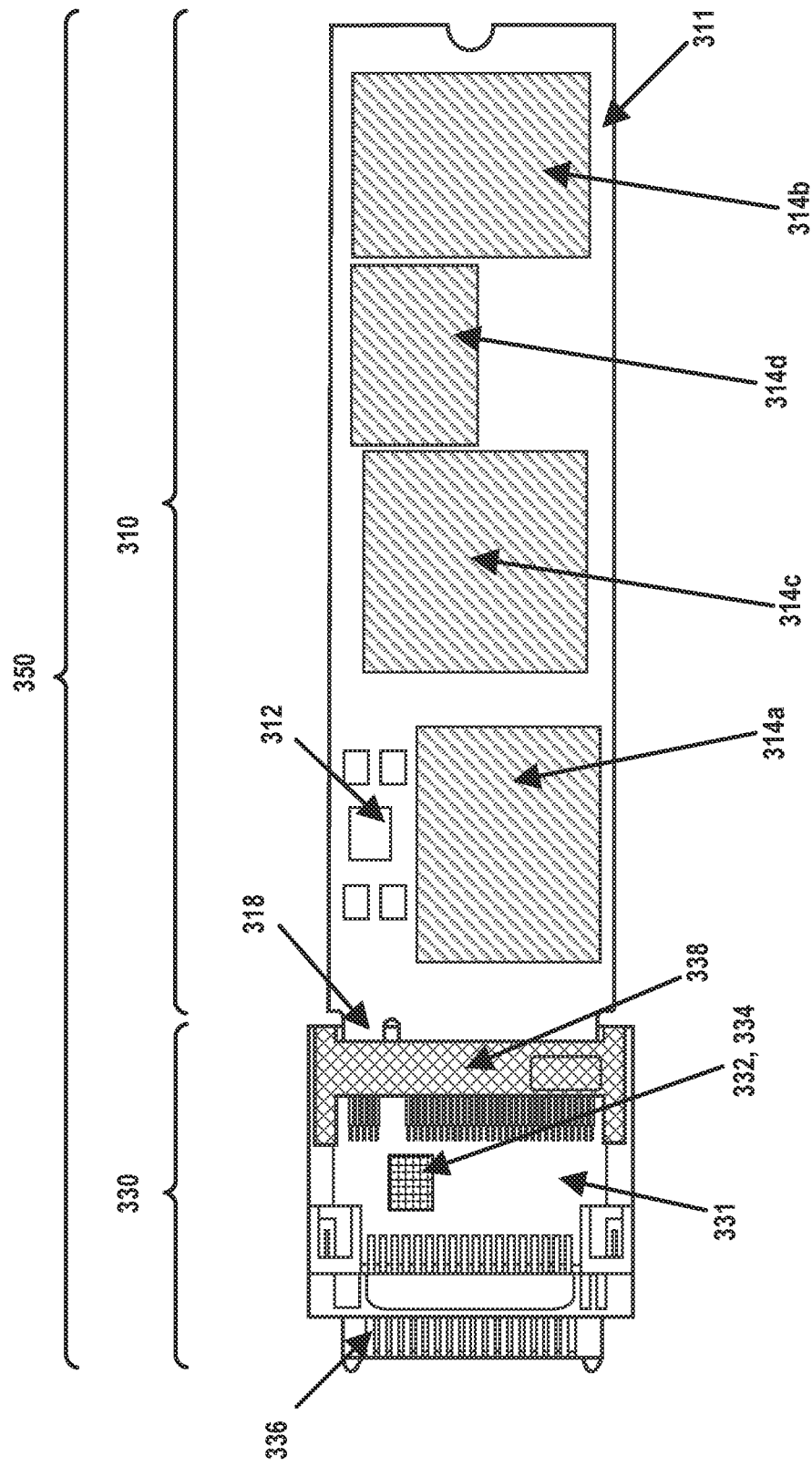
FIG. 3 is an example diagram of a data storage unit including an SSD and an adaptor coupled to the SSD, in accordance with some aspects of the disclosure.

FIG. 3 is an example diagram of a data storage unit including an SSD 310 and an adaptor 330 coupled to the SSD 310, in accordance with some aspects of the disclosure. In some aspects, the SSD 310 and the adaptor 330 may respectively correspond to the SSD 110 and the adaptor 130 of FIG. 1, and thus the features of the SSD 310 and the adaptor 330 may be similar to the features of the SSD 110 and the adaptor 130, respectively.

As shown in FIG. 3, the SSD 310 may include an array of non-volatile memory components 314a and 314b on an SSD printed circuit board (PCB) 311 and an SSD controller 314c to control the operations of the non-volatile memory components 314a and 314b. The SSD controller 314c may be implemented as a system on a chip (SoC). In an example, the SSD 310 may further include a power management integrated circuit (PMIC) 312 and a dynamic random-access memory (DRAM) 314d. The adaptor 330 includes an SSD connection interface 338. The SSD connection interface 338 may be coupled to a connection interface 318 of the SSD 310 to couple the SSD 310 to the adaptor 330. In an example, the SSD connection interface 338 may be a female connector (e.g., M.2 female connector) and the connection interface 318 may be a male connector (e.g., M.2 PCB edge connector). The adaptor 330 may have an adaptor PCB 331. The adaptor 330 includes an adaptor interface 336 and the SSD connection interface 338 on the adaptor PCB 331. The adaptor interface 336 may be plugged into a protocol converter such as the protocol converter 170 of FIG. 1. In the example illustrated in FIG. 3, the adaptor interface 336 is implemented as a male connector that may be coupled to a female connector of a protocol converter. Further, the adaptor 330 may have a non-volatile memory 332 and/or a temperature sensor 334, which may be located on the adaptor PCB 331. In some examples, the SSD 310 coupled to the adaptor 330 may be packaged together as a data storage unit 350. The data storage unit 350 may be freely plugged in and out of a protocol converter, using the adaptor interface 336. In some aspects, the connection interface 318, the adaptor interface 336, the SSD connection interface 338, the non-volatile memory 332, and the temperature sensor 334 may correspond to the connection interface 218, the adaptor interface 236, the SSD connection interface 238, the non-volatile memory 232, and the temperature sensor 234 of FIG. 2, respectively. In some aspects, the non-volatile memory components 314a and 314h may correspond to the memory array 114 of FIG. 1. In some aspects, the SSD controller 314c may correspond to the SSD controller 112 of FIG. 1.

Figure 4:
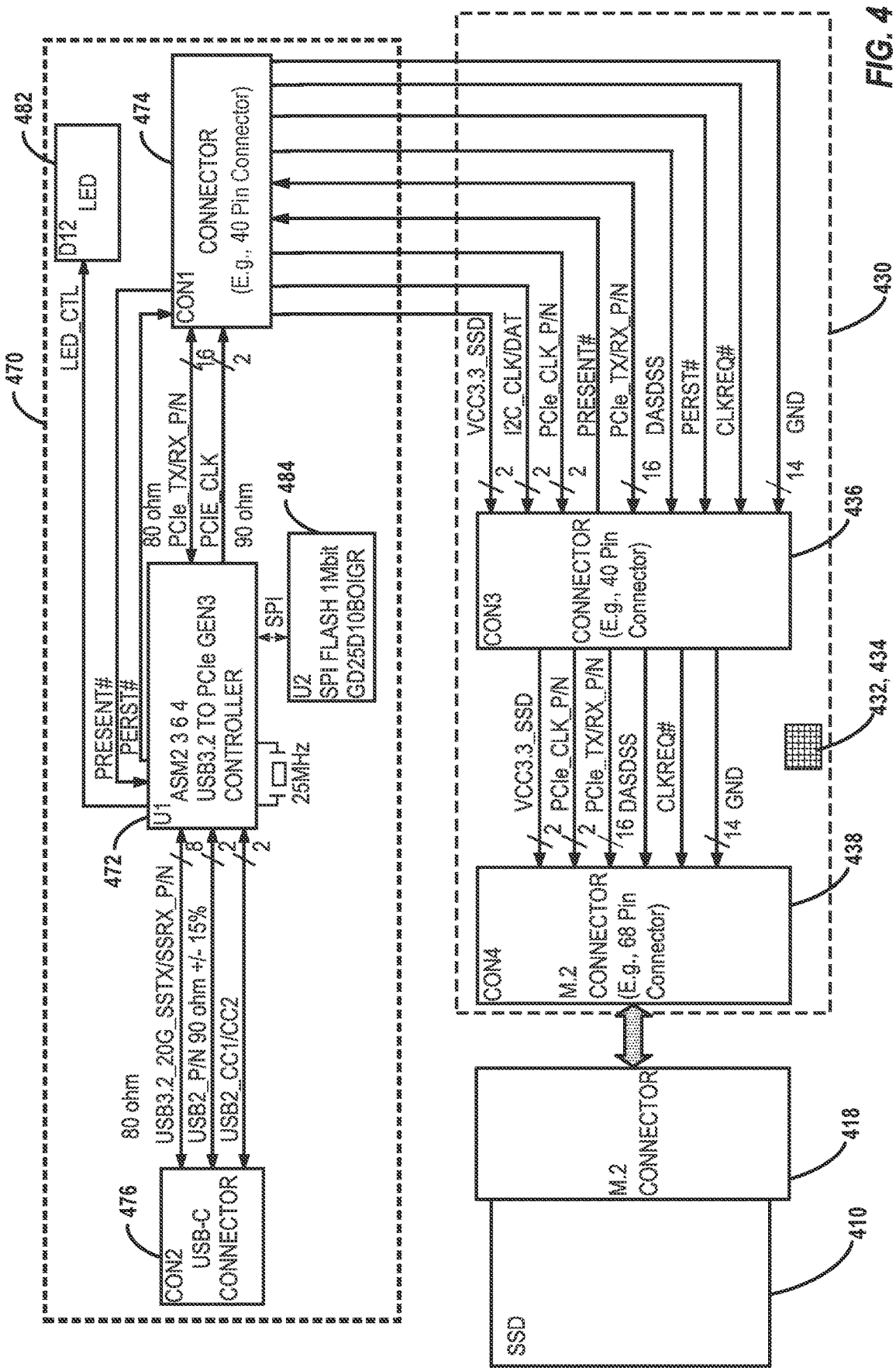
FIG. 4 is an example block diagram illustrating connections among various components of a protocol converter and a data storage unit including an SSD and an adaptor coupled to the SSD and a protocol converter, in accordance with some aspects of the disclosure.

FIG. 4 is an example block diagram illustrating connections among various components of a protocol converter and an adaptor coupled to an SSD, in accordance with some aspects of the disclosure. The example shown in FIG. 4 includes an exemplary implementation and thus different types of components and/or connections may be used in other examples. Further, in some aspects, an SSD 410, the adaptor 430, and the protocol converter 470 may respectively correspond to the SSD 110, the adaptor 130, and the protocol converter 170 of FIG. 1, and thus the features of the SSD 410, the adaptor 430, and the protocol converter 470 may be similar to the features of the SSD 110, the adaptor 130, and the protocol converter 170, respectively. In some aspects, an SSD 410, the adaptor 430, and the protocol converter 470 may respectively correspond to the SSD 210, the adaptor 230, and the protocol converter 270 of FIG. 2, and thus the features of the SSD 410, the adaptor 430, and the protocol converter 470 may be similar to the features of the SSD 210, the adaptor 230, and the protocol converter 270, respectively.

The adaptor 430 may include an SSD connection interface 438 that is used to connect to an SSD 410 via a connection interface 418 of the SSD 410, and may further include an adaptor interface 436 that is used to couple to the protocol converter 470. The SSD connection interface 438 may provide an M.2 connection to an SSD 410 via the connection interface 418, and may be connected to the adaptor interface 436 via a PCIe bus connection. The adaptor interface 436 may be coupled to a storage interface connector 474 of the protocol converter 470 via a PCIe bus connection. The adaptor interface 436 may also provide an I2C bus connection to the protocol converter 470, such that the power configuration table stored in a non-volatile memory (not shown in FIG. 4) at the adaptor 430 and/or temperature sensed by a temperature sensor at the adaptor 430 may be communicated via the I2C bus connection. A converter controller 472 of the protocol converter 470 may be connected to the storage interface 474 via a PCIe bus connection. The converter controller 472 may also be connected to a light emitting diode (LED) 482 to indicate an operation status and a flash device 484 (e.g., for storing configuration settings and/or firmware of the converter controller 472). Further, the converter controller 472 may be connected to a host interface 476 that provides a USB interface. The adaptor 430 may further include a non-volatile memory 432 and/or a temperature sensor 434. The non-volatile memory 432 stores the power configuration table. The temperature sensor 434 is configured to sense a temperature of the SSD 410.

In some aspects, the SSD 410 may be implemented using an M.2 form factor with the connection interface 418 having a PCIe edge connector rated for a first number of insertion cycle. In this aspect, the SSD connection interface 438 of the adaptor 430 includes a first connector configured to receive the PCIe edge connector of the connection interface 418 and PCIe signals, where the first connector has a first number of pins. Further, in this aspect, the adaptor interface 436 includes a second connector rated for a second number of insertion cycles and configured to receive the PCIe signals, where the second connector has a second number of pins. In this aspect, the second number of insertion cycles is greater than the first number of insertion cycles, and the second number of pins is less than the first number of pins. In an aspect, the first number of pins at the first connector of the SSD connection interface 438 may be 68 and the second number of pins at the second connector of the adaptor interface 436 may be 40. Further, a third number of pins at a third connector included in the storage interface 474 may be 40.

In an aspect, 68 traces respectively corresponding to the pins of the first connector at the SSD connection interface 438 having 68 pins may be integrated within a PCB having 4 layers or less. As such, the PCB may be kept small and at a low cost and high speed signals may be routed within PCIe timing requirements.

Figure 5:
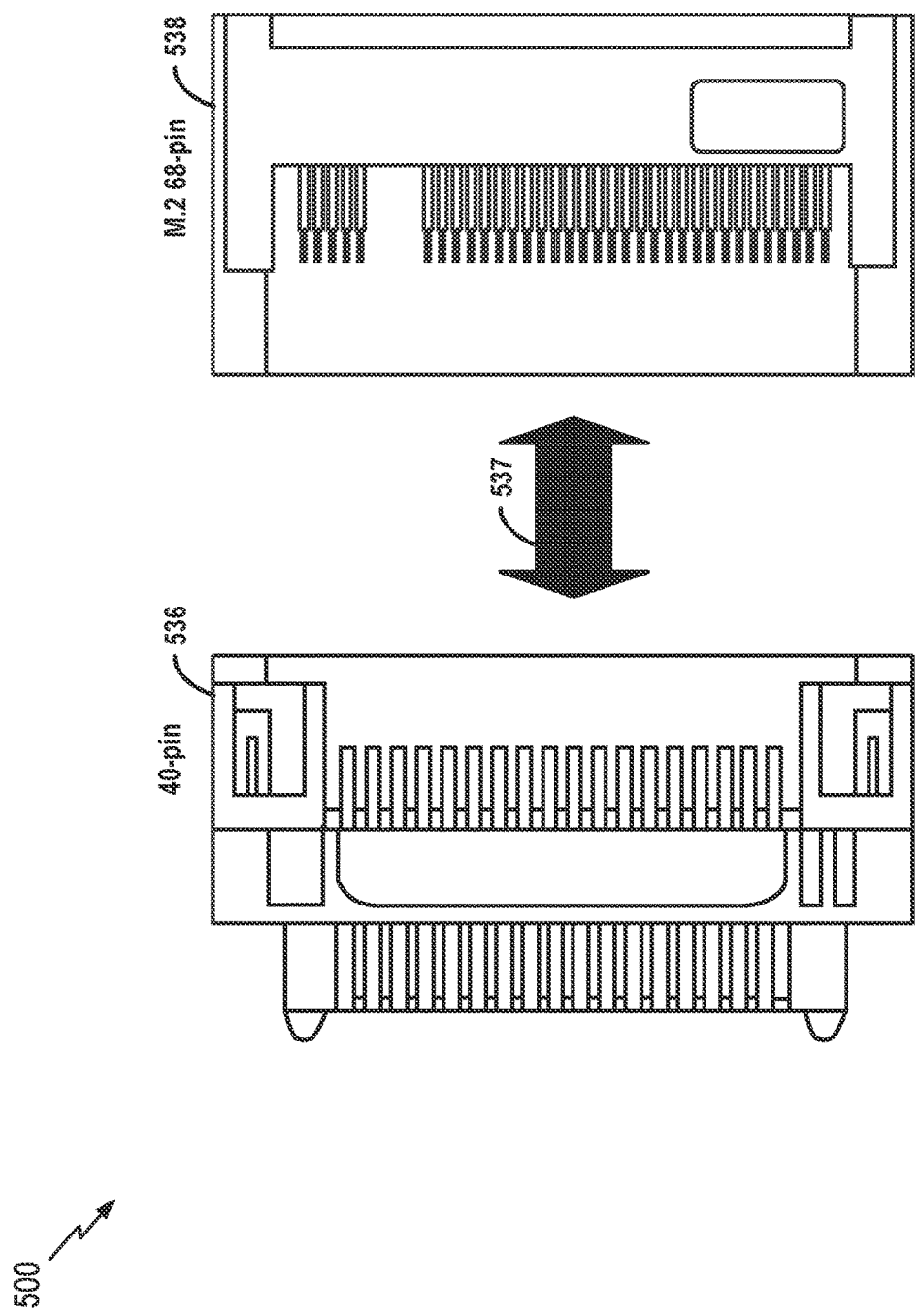
FIG. 5 is an example diagram illustrating mapping between a 68-pin connector and a 40-pin connector, in accordance with some aspects of the disclosure.

FIG. 5 is an example diagram 500 illustrating mapping between a 68-pin connector and a 40-pin connector, in accordance with some aspects of the disclosure. As shown in FIG. 5, a second connector of an adaptor interface 536 having 40 pins may be mapped to a first connector (e.g., M.2 connector) of an SSD connection interface 538 having 68 pins. For example, the adaptor interface 536 may correspond to the adaptor interface 236 of the adaptor 230 in FIG. 2 or the adaptor interface 336 of the adaptor 330 in FIG. 3, and the SSD connection interface 538 may correspond to the SSD connection interface 238 of FIG. 2 or the SSD connection interface 338 of FIG. 3. This mapping 537 between the first connector and the second connector may be provided by a pin adaptor. For example, the pin adaptor may be implemented to route PCIe signals from the 68 pins of the first connector to the 40 pins of the second connector, where the 68 traces respectively corresponding to the 68 pins of the first connector are integrated within the PCBA implemented using a PCB having 4 layers or less.

For example, the mapping 537 may be performed based on the table below.

TABLE 1

M.2 68-pin to 40-pin Connector Mapping

| Pin Function | M.2 68-Pin Connector | 40-Pin Connector |
| --- | --- | --- |
| Power | 9 | 2 |
| GND | 14 | 12 |
| Mechanical GND | 2 | 4 |
| Mechanical Key | Yes (on connector) | Yes (on enclosure) |
| PCIe Tx +/− | 8 (4 pairs) | 8 (4 pairs) |
| PCIe Rx +/− | 8 (4 pairs) | 8 (4 pairs) |
| PRESENT (hot plug) | 0 | 1 |
| DASDSS | 1 | 1 |
| DEVSLP | 1 | 0 |
| SMBus/I2C | 2 | 2 |
| PERST_n | 1 | 1 |
| CLKREQ_n | 1 | 1 |
| PEWAKE_n | 1 | 0 |
| SUSCLK_32 KHz | 1 | 0 |

As shown in the table above, the number of pins used for a certain pin function such as Power, GND, Mechanical GND, PRESENT, DEVSLP, PEWAKE_n, and SUSCLK_32 KHz is different between the first connector having 68 pins and the second connector having 40 pins. It is noted that the second connector provides support for the hot plug circuitry, while the first connector does not.

For example, in the 40-pin second connector, when compared with the 68-pin first connector, the pins respectively for DEVSLP, PEWAKE, and SUSCLK are removed while the Present pin is added for the hot plug support. Further, the GND pins are maintained around the PCIe differential signals to preserve high-speed signal integrity. Two pins are assigned for SMBus/I2C (I2C Clock and Data) for an interface for a non-volatile memory (e.g., the non-volatile memory 332, EEPROM) and/or a temperature sensor (e.g., temperature sensor 334) implemented on an adaptor PCB (e.g., adaptor PCB 331). PCIe Tx and Rx are assigned on different side of the connector to minimize crosstalk.

Figure 6:
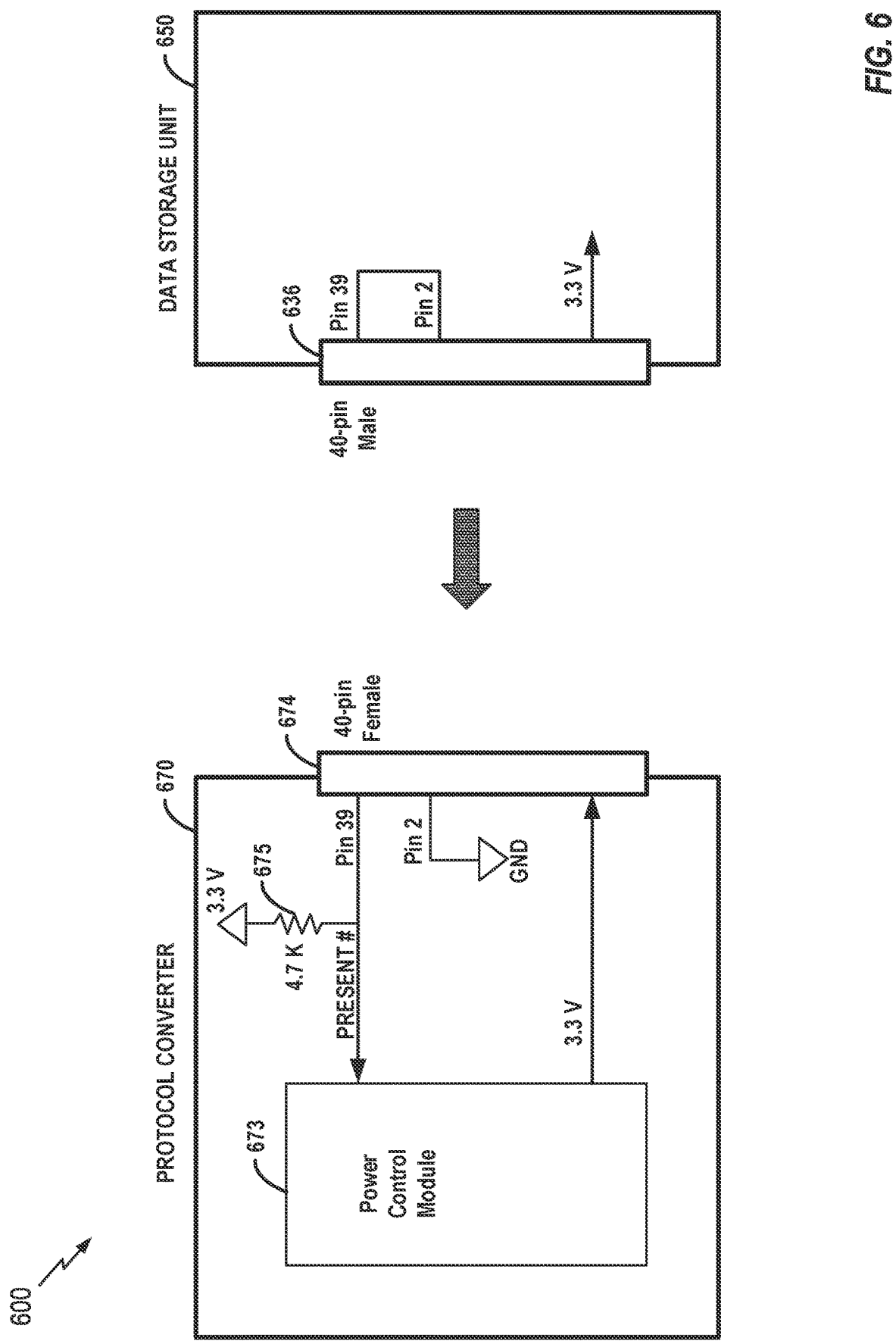
FIG. 6 is an example diagram illustrating hot plug circuitry configured to indicate to a protocol converter whether an adaptor is connected to the protocol converter, in accordance with some aspects of the disclosure.

FIG. 6 is an example diagram 600 illustrating hot plug circuitry configured to indicate to a protocol converter when an adaptor is connected to the protocol converter, in accordance with some aspects of the disclosure. As shown in FIG. 6, a protocol converter 670 includes a storage interface 674 and a data storage unit 650 has an adaptor interface 636 that is configured to couple with the protocol converter 670 via a storage interface 674. For example, the protocol converter 670 with the storage interface 674 may correspond to the protocol converter 270 with the storage interface 274 as shown in FIG. 2. Further, for example, the data storage unit 650 with the adaptor interface 636 may correspond with the data storage unit 250 with the adaptor interface 236 of the adaptor 230, as shown in FIG. 2. The protocol converter 670 further includes a power control module 673. In some aspects, the power control module 673 may be a part of a converter controller, which may correspond to the converter controller 272 of FIG. 2.

At a third connector of the storage interface 674, pin 39 (PRESENT #) is connected to the power control module 673 and a pull-up resistor 675 and pin 2 (GND) is connected to the ground, while pin 39 and pin 2 are not connected to each other. At a second connector of the adaptor interface 636, pin 39 is connected to pin 2. In order to detect that the data storage unit 650 is completely plugged into the protocol converter 670 via the adaptor interface 636 and the storage interface 674, the pins 39 and 2 of the third connector of the storage interface 674 must make contact with the corresponding pins 39 and 2 of the second connector of the adaptor interface 636 to cause the voltage of the PRESENT #signal (at pin 39 of the third connector) to change from high to low. The voltage of the PRESENT #signal (at pin 39 of the third connector) changing from high to low indicates that the data storage unit 650 is completely plugged in. The pull-up resistor 675 (e.g., 4.7K Ohm) pulls the voltage of the PRESENT #signal at pin 39 of the third connector to high (e.g., 3.3V), if the pins 39 and 2 of the third connector of the storage interface 674 do not contact the pins 39 and 2 of the second connector of the adaptor interface 636. Hence, if the power control module 673 detects a high signal (e.g., 3.3V) at pin 39 of the third connector, the power control module 673 determines that the data storage unit 650 is not plugged in with the protocol converter 670. If the pins 39 and 2 of the third connector of the storage interface 674 contact the pins 39 and 2 of the second connector of the adaptor interface 636, the voltage of the PRESENT #signal at pin 39 of the third connector changes from high to low because pin 39 of the third connector of the storage interface 674 becomes connected to the ground via the pins 39 and 2 of the second connector of the adaptor interface 636 and then via pin 2 of the third connector of the storage interface 674. Therefore, if the power control module 673 detects a low signal at pin 39 of the third connector, the power control module 673 determines that the data storage unit 650 is plugged in to (e.g., securely coupled to) the protocol converter 670.

Figure 7:
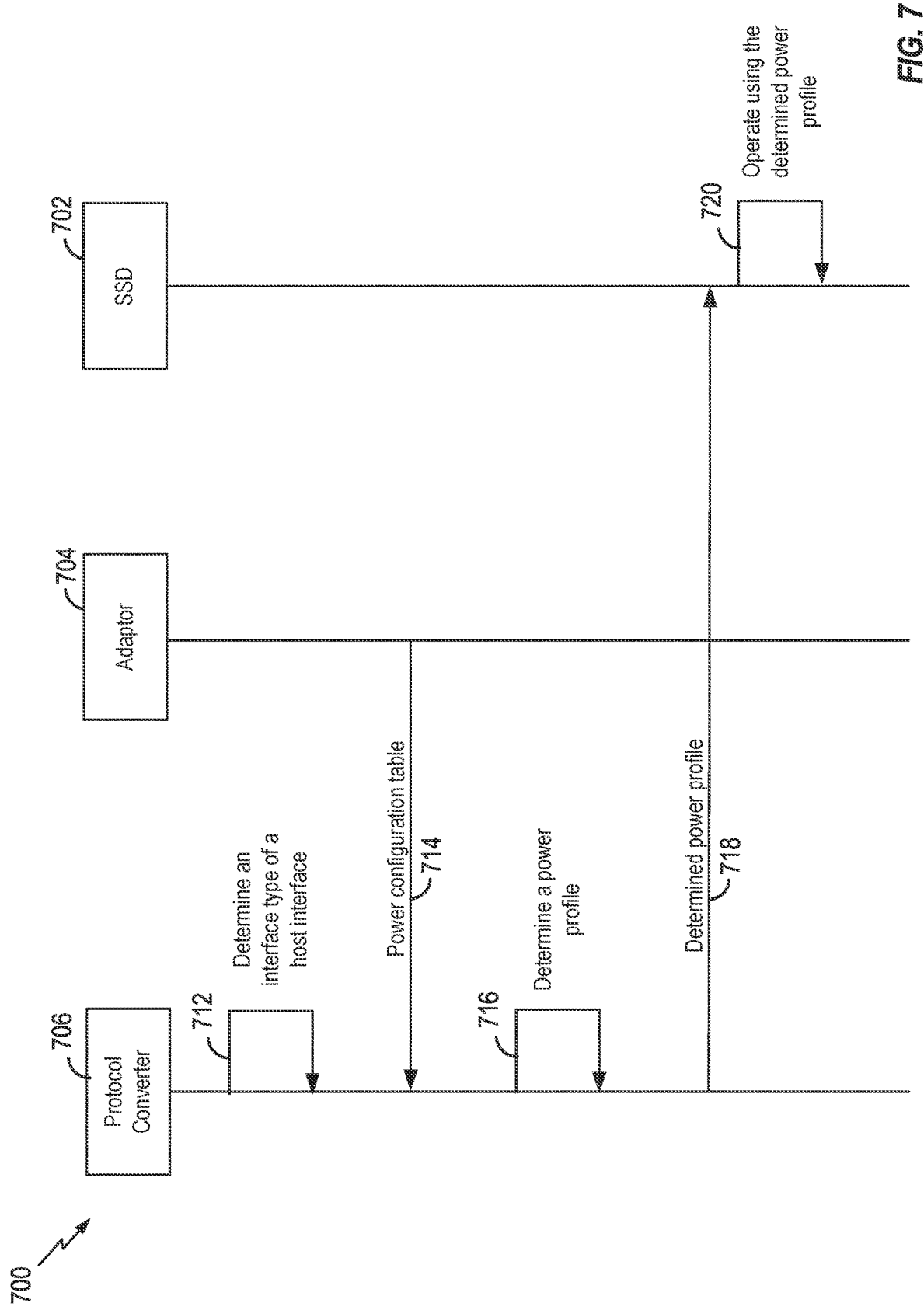
FIG. 7 is an example flow diagram illustrating operations to determine a power profile by a data storage system including an SSD, an adaptor, and a protocol converter, in accordance with some aspects of the disclosure.

FIG. 7 is an example flow diagram 700 illustrating operations to determine a power profile by a data storage system including an SSD 702, an adaptor 704, and a protocol converter 706, in accordance with some aspects of the disclosure. In one aspect, the SSD 702 may be the SSD 110 of FIG. 1, the SSD 210 of FIG. 2, the SSD 310 of FIG. 2, or any other suitably equipped device. Hence, the SSD 702 may be configured to store data. In one aspect, the adaptor 704 may be the adaptor 130 of FIG. 1, the adaptor 230 of FIG. 2, the adaptor 330 of FIG. 3, the adaptor 430 of FIG. 4, or any other suitably equipped device. Thus, the adaptor 704 may be coupled to the SSD 702 via a first bus interface protocol. In one aspect, the protocol converter 706 may be the protocol converter 170 of FIG. 1, the protocol converter 270 of FIG. 2, the protocol converter 370 of FIG. 3, or any other suitably equipped device. Hence, the protocol converter 706 may be configured to couple to an adaptor coupled to the SSD using a first bus interface protocol, convert first signals of the first bus interface protocol to second signals for a second bus interface protocol different from the first bus interface protocol, and couple to a host using the second bus interface protocol.

In some aspects, the adaptor 704 may include a non-volatile memory storing a power configuration table. In an aspect, the power configuration table may include multiple power profiles for the SSD 702, where each of the power profiles corresponds to one of multiple interface types for the second bus interface protocol.

At 712, the protocol converter 706 determines an interface type of the second bus interface protocol of a host interface of the protocol converter 706.

At 714, the protocol converter 706 reads the power configuration table from the non-volatile memory to determine a power profile of the multiple power profiles that corresponds to the determined interface type.

At 716, from the multiple power profiles, the protocol converter 706 determines a power profile that corresponds to the determined interface type.

At 718, the protocol converter 706 sends a command (e.g., a vendor specific command of the particular SSD) to the SSD 702 (e.g., via the adaptor 704) to operate using the determined power profile.

At 720, the SSD 702 (e.g., via an SSD controller) operates using the determined power profile (e.g., operates in accordance with the determined power profile).

FIG. 8 is a flow diagram 800 illustrating operations to read the SSD temperature and perform thermal management by a data storage system including an SSD 802, an adaptor 804, and a protocol converter 806, in accordance with some aspects of the disclosure. In one aspect, the SSD 802 may be the SSD 110 of FIG. 1, the SSD 210 of FIG. 2, the SSD 310 of FIG. 2, or any other suitably equipped device. In one aspect, the adaptor 804 may be the adaptor 130 of FIG. 1, the adaptor 230 of FIG. 2, the adaptor 430 of FIG. 4, or any other suitably equipped device. In one aspect, the protocol converter 806 may be the protocol converter 170 of FIG. 1, the protocol converter 270 of FIG. 2, or the protocol converter 470 of FIG. 4, or any other suitably equipped device.

At 812, a temperature sensor at the adaptor 804 may sense a temperature of the SSD 802. Optionally, before 812, the protocol converter 806 may send a request for the temperature sensor at the adaptor 804 to measure temperature, and the temperature sensor may respond by performing the action of 812.

At 814, the protocol converter 806 may receive the sensed temperature from the adaptor 804.

At 816, in some aspects, the protocol converter 806 may receive a temperature threshold from the adaptor 804. For example, the temperature threshold may be stored in the non-volatile memory of the adaptor 804 or in the SSD 802. In another example, the temperature threshold may be received from a host connected to the protocol converter 806. In another example, the threshold temperature may be stored at the protocol converter 806 along with other initial configuration settings.

At 818, the protocol converter 806 compares the sensed temperature with the temperature threshold, e.g., by determining whether the sensed temperature exceeds the temperature threshold.

At 820, the protocol converter 806 may generate a command based on the comparison of 818. In some aspects, if the sensed temperature exceeds the temperature threshold, the protocol converter 806 may generate a command to throttle down operations at the SSD 802. In some aspects, if the sensed temperature is less than or equal to the temperature threshold, and the throttle down command was previously sent, the protocol converter 806 may generate a command to stop throttling down operations at the SSD 802.

At 822, the protocol converter 806 may send the generated command to the SSD 802 (e.g., via the adaptor 804) to control the operation of the SSD 802.

At 822, the protocol converter 806 may manage a cooling device based on the comparison of 818. In some aspects, if the sensed temperature exceeds the temperature threshold, the protocol converter 806 activate the cooling device to reduce the temperature at the SSD 802. In some aspects, if the sensed temperature is less than or equal to the temperature threshold, the protocol converter 806 may deactivate the cooling device.

Figure 9A:
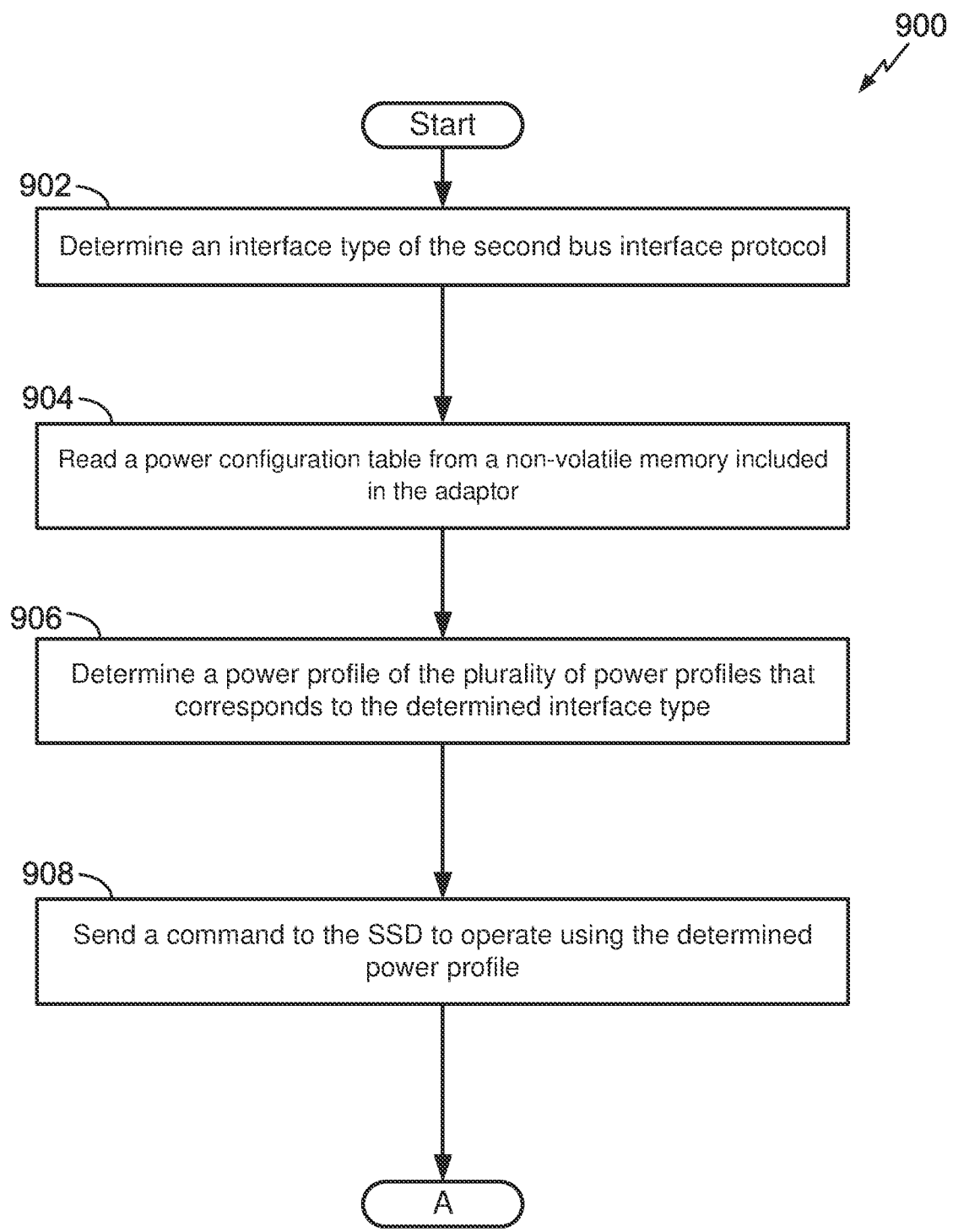
FIG. 9A is a flowchart illustrating a method of managing an operation of a solid-state device (SSD) by a protocol converter, in accordance with some aspects of the disclosure.

FIG. 9A is a flowchart 900 illustrating a method of managing an operation of an SSD by a protocol converter, in accordance with some aspects of the disclosure. In one aspect, the method/process 900 may be performed by the converter controller 172 of FIG. 1, the converter controller 272 of FIG. 2, the converter controller 472 of FIG. 4, or any other suitably equipped device. In some aspects, the protocol converter may be configured to couple to an adaptor coupled to the SSD using a first bus interface protocol, convert first signals of the first bus interface protocol to second signals for a second bus interface protocol different from the first bus interface protocol, and couple to a host using the second bus interface protocol.

At 902, the process determines an interface type of the second bus interface protocol. In one aspect, the converter controller 172 of the protocol converter 170 of FIG. 1 may act as a means for determining the interface type of the second bus protocol.

At 904, the process reads a power configuration table from a non-volatile memory included in the adaptor. In an aspect, the power configuration table may include a plurality of power profiles for the SSD each corresponding to one of a plurality of interface types for the second bus interface protocol. In some aspects, the SSD may include a plurality of features and the power configuration table stored in the non-volatile memory of the SSD is associated with at least one of the plurality features of the SSD. In one aspect, the converter controller 172 of the protocol converter 170 of FIG. 1 may act as a means for reading the power configuration table from the non-volatile memory included in the adaptor.

At 906, the process determines a power profile of the plurality of power profiles that corresponds to the determined interface type. In one aspect, the converter controller 172 of the protocol converter 170 of FIG. 1 may act as a means for determining the power profile of the plurality of power profiles that corresponds to the determined interface type.

At 908, the process sends a command to the SSD to operate using the determined power profile. In one aspect, the converter controller 172 of the protocol converter 170 of FIG. 1 may act as a means for sending the command to the SSD to operate using the determined power profile.

In some aspects, the adaptor further comprises an I2C bus connected to the non-volatile memory, and the reading the power configuration table comprises reading the power configuration table from the non-volatile memory via the I2C bus. In this aspect, the I2C bus may be different from a bus of the first bus interface protocol.

In some aspects, the non-volatile memory comprises an EEPROM.

In some aspects, the first bus interface protocol may be specified by PCIe. In some aspects, the second bus interface protocol may be specified by at least one of USB or Thunderbolt.

Figure 9B:
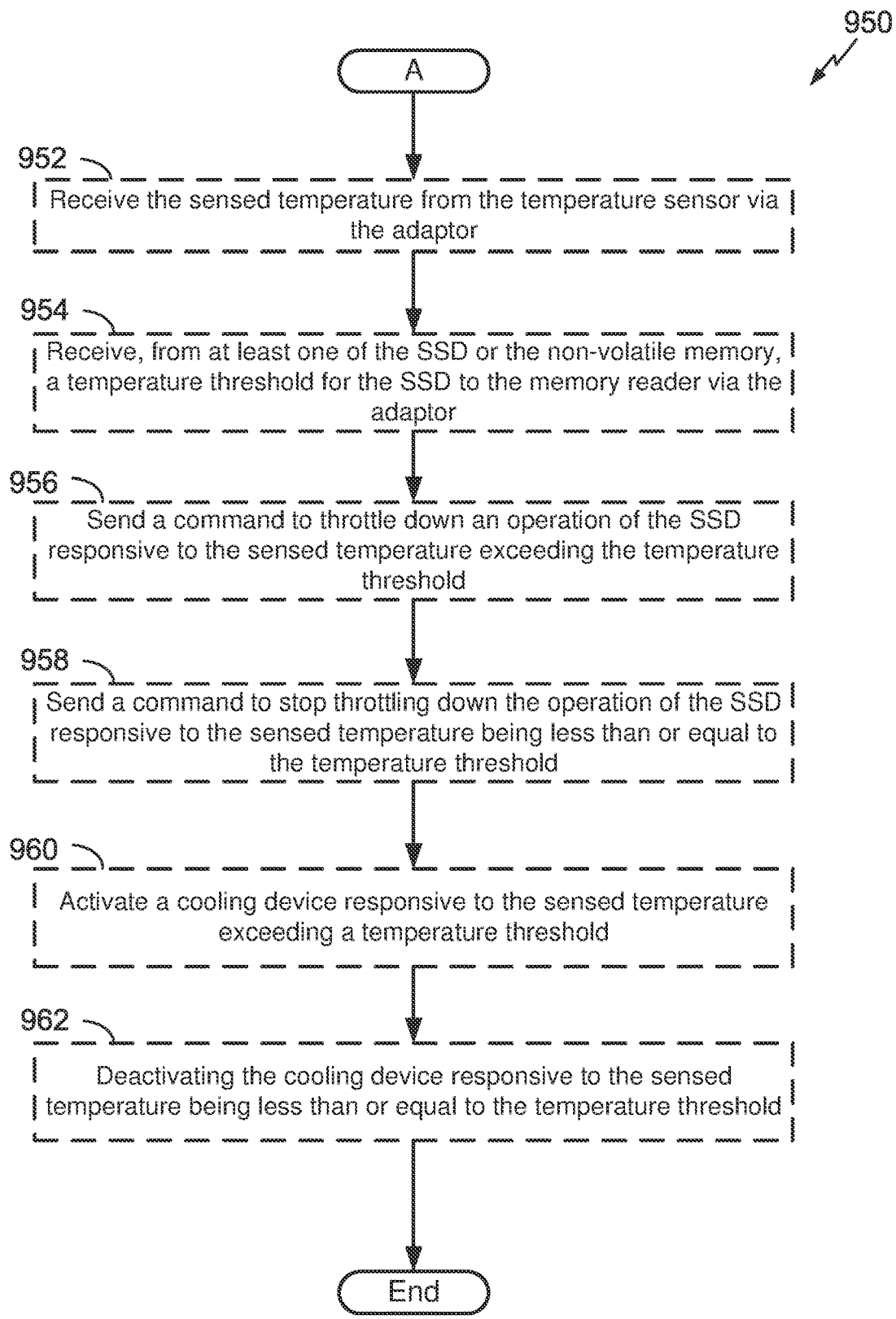
FIG. 9B is a flowchart illustrating the method of managing the operation of the SSD by the protocol converter, continuing from the flowchart of FIG. 9A, in accordance with some aspects of the disclosure.

FIG. 9B is a flowchart 950 illustrating the method of managing the operation of the SSD by the protocol converter, continuing from the flowchart 900 of FIG. 9A, in accordance with some aspects of the disclosure. In one aspect, the method/process 950 may be performed by the converter controller 172 of FIG. 1, the converter controller 272 of FIG. 2, the converter controller 472 of FIG. 4, or any other suitably equipped device controller. In an aspect, the adaptor may further include a temperature sensor configure to sense a temperature of the SSD.

At 952, in some aspects, the process may receive the sensed temperature from the temperature sensor via the adaptor.

At 954, in some aspects, the process may receive, from at least one of the SSD or the non-volatile memory, a temperature threshold for the SSD via the adaptor.

At 956, in some aspects, the process may send a command to throttle down an operation of the SSD responsive to the sensed temperature exceeding the temperature threshold.

At 958, in some aspects, the process may send a command to stop throttling down the operation of the SSD responsive to the sensed temperature being less than or equal to the temperature threshold.

At 960, in some aspects, the process may activate a cooling device responsive to the sensed temperature exceeding a temperature threshold.

At 962, in some aspects, the process may deactivate the cooling device responsive to the sensed temperature being less than or equal to the temperature threshold At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented, or a method may be practiced using any number of the aspects set forth herein. In addition, such an apparatus may be implemented, or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment." "in one aspect," or similar language means that a particular feature, structure, or characteristic described in connection with the embodiment is included in at least one embodiment of the present disclosure. Thus, appearances of the phrases "in one embodiment," "in an embodiment," "in one aspect," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC). Likewise, "at least one of: A, B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database, a data store, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage system, comprising:
   a solid-state device (SSD) configured to store data;
   an adaptor coupled to the SSD via a first bus interface protocol and comprising a non-volatile memory storing a power configuration table;
   a protocol converter configured to:
      couple to the adaptor using the first bus interface protocol;
      convert first signals of the first bus interface protocol to second signals for a second bus interface protocol different from the first bus interface protocol; and
      couple to a host using the second bus interface protocol;
   wherein the power configuration table comprises a plurality of power profiles for the SSD each corresponding to one of a plurality of interface types for the second bus interface protocol;
   wherein the protocol converter is further configured to:
      determine an interface type of the second bus interface protocol;
      read the power configuration table from the non-volatile memory to determine a power profile of the plurality of power profiles that corresponds to the determined interface type; and
      send a command to the SSD to operate using the determined power profile.

2. The data storage system of claim 1, wherein the SSD is configured with an M.2 form factor.

3. The data storage system of claim 1, wherein the SSD comprises a plurality of features and the power configuration table stored in the non-volatile memory of the SSD is associated with at least one of the plurality features of the SSD.

4. The data storage system of claim 1, wherein the adaptor further comprises an inter-integrated circuit (I2C) bus connected to the non-volatile memory, and
   wherein the protocol converter is configured to read the power configuration table from the non-volatile memory via the I2C bus.

5. The data storage system of claim 1, wherein the non-volatile memory comprises an electrically erasable programmable read-only memory (EEPROM).

6. The data storage system of claim 1, wherein the adaptor is implemented using a printed circuit board (PCB) and the non-volatile memory is disposed on the PCB.

7. The data storage system of claim 1, wherein the adaptor further comprises a temperature sensor configure to sense a temperature of the SSD,
   wherein the protocol converter is further configured to:
      receive the sensed temperature from the temperature sensor via the adaptor;
      determine whether the sensed temperature exceeds a temperature threshold; and
      perform, responsive to the sensed temperature exceeding the temperature threshold, at least one of:
         send a command to the SSD to throttle down operations at the SSD, or
         activate a cooling device configured to cool the SSD.

8. The data storage system of claim 1, wherein the first bus interface protocol is specified by peripheral component interconnect express (PCIe), and the second bus interface protocol is specified by at least one of universal serial bus (USB) or Thunderbolt.

9. The data storage system of claim 1, wherein the SSD comprises an M.2 form factor with a peripheral component interface express (PCIe) edge connector rated for a first number of insertion cycles, and
wherein the adaptor comprises:
a first connector configured to receive the PCIe edge connector and a plurality of PCIe signals, the first connector comprising a first number of pins; and
a second connector rated for a second number of insertion cycles and configured to receive the plurality of PCIe signals, the second connector comprising a second number of pins;
wherein the second number of insertion cycles is greater than the first number of insertion cycles; and
wherein the second number of pins is less than the first number of pins.

10. The data storage system of claim 4, wherein the I2C bus is different from a bus of the first bus interface protocol.

11. The data storage system of claim 7, wherein the protocol converter is further configured to perform, responsive to the sensed temperature being less than or equal to the temperature threshold, at least one of:
send a command to stop throttling down the operation of the SSD, or
deactivate the cooling device.

12. The data storage system of claim 7, wherein the protocol converter is further configured to:
receive, from at least one of: the SSD or the non-volatile memory, the temperature threshold for the SSD via the adaptor.

13. The data storage system of claim 7, wherein the temperature sensor is integrated with the non-volatile memory.

14. The data storage system of claim 7, wherein the temperature sensor comprises an inter-integrated circuit (I2C) bus, and
wherein the protocol converter is configured to receive the sensed temperature from the temperature sensor via the I2C bus.

15. The data storage system of claim 9, wherein the first number of pins is 68 and the second number of pins is 40.

16. The data storage system of claim 9, wherein the protocol converter and the adaptor comprise hot plug circuitry configured to indicate to the protocol converter whether the adaptor is connected to the protocol converter via the second connector.

17. The data storage system of claim 14, wherein the I2C bus is different from a bus of the first bus interface protocol.

18. The data storage system of claim 15, wherein 68 traces respectively corresponding to the pins of the first connector having 68 pins are integrated within a printed circuit board (PCB) having 4 layers or less.

19. The data storage system of claim 16, wherein:
the protocol converter comprises a third connector configured to couple with the second connector;
the hot plug circuitry at the protocol converter comprises a pull up resistor coupled to a first pin of the third connector and a second pin of the third connector coupled to a ground; and
the hot plug circuitry at the adaptor is configured to complete a connection between the first pin and the second pin such that a voltage at the first pin is pulled to ground responsive to the adaptor being connected to the protocol converter via the second connector.

20. A method of managing an operation of a solid-state device (SSD) by a protocol converter, wherein the protocol converter is configured to couple to an adaptor coupled to the SSD using a first bus interface protocol, convert first signals of the first bus interface protocol to second signals for a second bus interface protocol different from the first bus interface protocol, and couple to a host using the second bus interface protocol, the method comprising:
determining an interface type of the second bus interface protocol;
reading a power configuration table from a non-volatile memory included in the adaptor, wherein the power configuration table comprises a plurality of power profiles for the SSD each corresponding to one of a plurality of interface types for the second bus interface protocol;
determining a power profile of the plurality of power profiles that corresponds to the determined interface type; and
sending a command to the SSD to operate using the determined power profile.

21. A protocol converter for managing an operation of a solid-state device (SSD), wherein the protocol converter is configured to couple to an adaptor coupled to the SSD using a first bus interface protocol, convert first signals of the first bus interface protocol to second signals for a second bus interface protocol different from the first bus interface protocol, and couple to a host using the second bus interface protocol, the protocol converter comprising:
means for determining an interface type of the second bus interface protocol;
means for reading a power configuration table from a non-volatile memory included in the adaptor, wherein the power configuration table comprises a plurality of power profiles for the SSD each corresponding to one of a plurality of interface types for the second bus interface protocol;
means for determining a power profile of the plurality of power profiles that corresponds to the determined interface type; and
means for sending a command to the SSD to operate using the determined power profile.

* * * * *